United States Patent
Kasai

(10) Patent No.: US 7,760,233 B2
(45) Date of Patent: Jul. 20, 2010

(54) PORTABLE TERMINAL AND COMMUNICATION SYSTEM CONTROLLABLE BY REMOTE MAIL

(75) Inventor: Nobuyuki Kasai, Hokkaido (JP)

(73) Assignee: Kyocera Corporation, Kyoto (JP)

( * ) Notice: Subject to any disclaimer, the term of this patent is extended or adjusted under 35 U.S.C. 154(b) by 1386 days.

(21) Appl. No.: 11/016,419

(22) Filed: Dec. 17, 2004

(65) Prior Publication Data

US 2005/0134694 A1 Jun. 23, 2005

(30) Foreign Application Priority Data

Dec. 19, 2003 (JP) ............................. 2003-422192

(51) Int. Cl.
*H04N 5/225* (2006.01)
*H04N 5/232* (2006.01)
(52) U.S. Cl. ............................... 348/207.1; 348/211.99
(58) Field of Classification Search .............. 348/211.1, 348/207.1, 211.99; 455/466; 725/105
See application file for complete search history.

(56) References Cited

U.S. PATENT DOCUMENTS

| 6,750,902 | B1 * | 6/2004 | Steinberg et al. | 348/211.3 |
| 6,930,709 | B1 * | 8/2005 | Creamer et al. | 348/211.3 |
| 7,202,885 | B2 * | 4/2007 | Motohashi | 348/14.02 |
| 7,219,365 | B2 * | 5/2007 | Sato et al. | 725/105 |
| 2003/0208567 | A1 * | 11/2003 | Gross | 709/220 |
| 2005/0118990 | A1 * | 6/2005 | Stephens | 455/418 |

FOREIGN PATENT DOCUMENTS

| JP | 05284319 A | 10/1993 |
| JP | 09172540 A | 6/1997 |
| JP | 2000270382 A | 9/2000 |
| JP | 2002-351794 | 12/2002 |
| JP | 2003-143261 | 5/2003 |
| JP | 2003163924 A | 6/2003 |
| JP | 2003219043 A | 7/2003 |

OTHER PUBLICATIONS

Japanese language office action and its English language translation for corresponding Japanese application 2003422192 lists the references above.

* cited by examiner

*Primary Examiner*—David L Ometz
*Assistant Examiner*—Akshay Trehan
(74) *Attorney, Agent, or Firm*—Hogan Lovells US LLP

(57) ABSTRACT

A portable terminal has an imaging section, a storage section that stores an image picked up by the imaging section, a radio section that transmits and receives data through a communication network, and a control section that controls the imaging section and the radio section. When the radio section receives an e-mail, the control section extracts an instruction information from the e-mail, controls the imaging section to pick up an image, determines the timing of transmitting the picked-up image to a predetermined destination based on the instruction information, and controls the radio section to transmit the picked-up image at the determined timing.

18 Claims, 7 Drawing Sheets

FIG. 3

To: keitai2b@ezweb.ne.jp

From: keitai2a@ezweb.ne.jp

Subject: *Remote Mail*

<start> keitai2c@ezweb.ne.jp: 1 :100

<end>

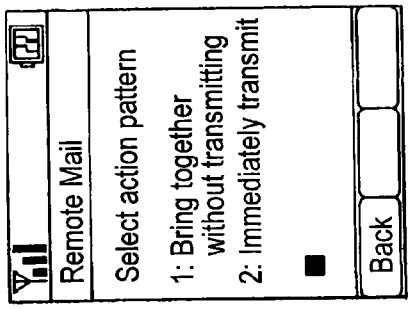
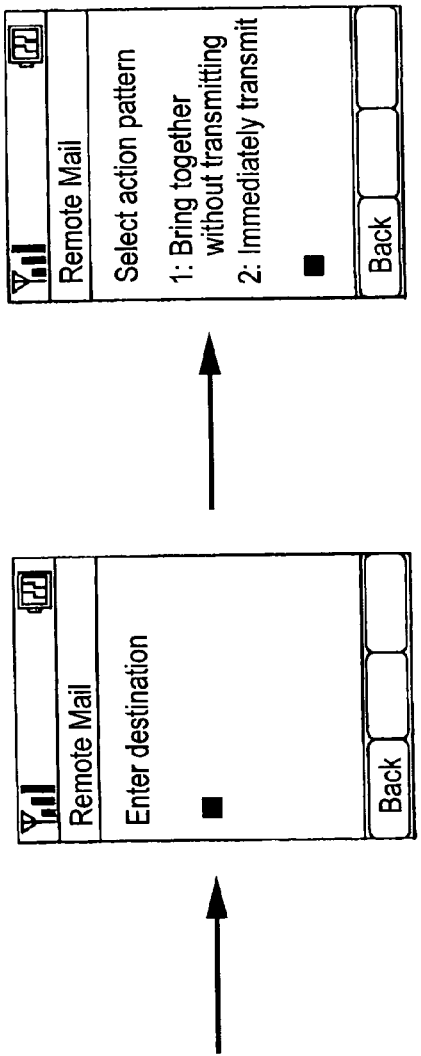
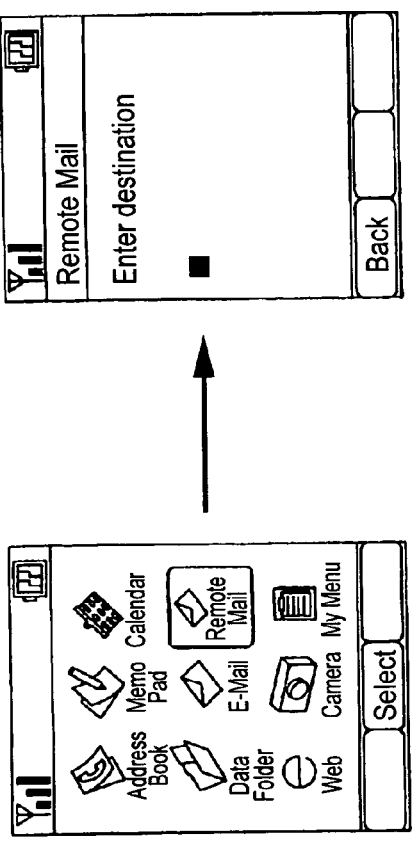
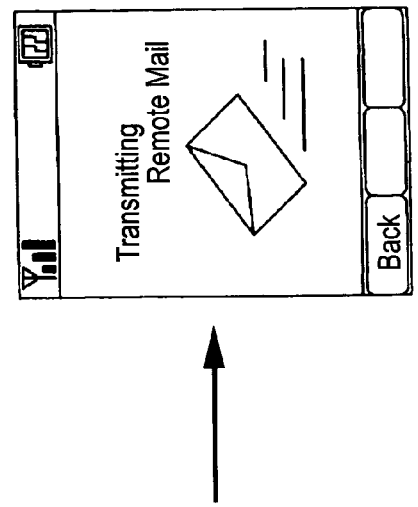
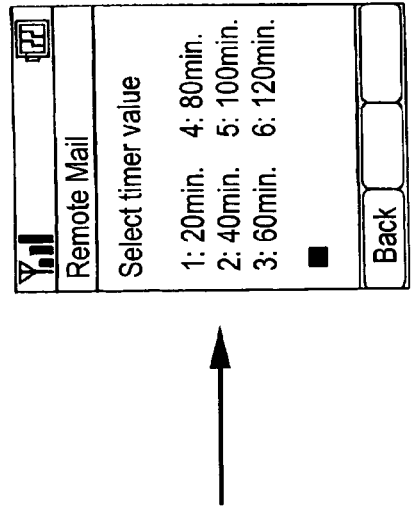

PORTABLE TERMINAL AND COMMUNICATION SYSTEM CONTROLLABLE BY REMOTE MAIL

BACKGROUND OF THE INVENTION

1. Field of the Invention

The invention relates to a portable terminal, which has an imaging function and a communication function, for picking up an image and transmitting the picked-up image to another terminal when the portable terminal receives a predetermined e-mail, and a communication system using the portable terminal.

2. Description of the Related Art

Conventionally, in order to enable a user to pick up an image by remote control, a mobile telephone having a communication function and an imaging function, which performs an imaging operation when the mobile telephone receives an e-mail and stores the picked-up image (image data), has been available. (For example, refer to JP-A-2003-143261.)

Likewise, as a mobile telephone which enables to pick up an image by remote control, a mobile telephone for picking up an image immediately when the mobile telephone receives a predetermined e-mail and transmitting the picked-up image to a terminal corresponding to the e-mail address indicated by the predetermined e-mail has been available.

JP-A-2003-143261 is referred to as a related art.

However, the above mobile telephone transmits an e-mail to another terminal each time the mobile telephone picks up an image. Therefore, a battery of the mobile telephone rapidly consumes. Further, the communication cost increases.

If another terminal receives a large number of e-mails transmitted from the mobile telephone, the user of the another terminal cannot view all picked-up images unless the user opens and checks the e-mails one by one. Therefore, the number of operation times increases and the work is very troublesome for the user.

SUMMARY OF THE INVENTION

The object of the invention is to provide a portable terminal which reliably transmits an image picked up by remote control, suppresses consumption of a battery, reduces the communication cost, and decreases the number of operation times of opening e-mail in the portable terminal receiving the e-mail, and a communication system using the portable terminal.

The invention provides a portable terminal having: an imaging section; a storage section that stores an image picked up by the imaging section; a radio section that transmits and receives data through a communication network; and a control section that controls the imaging section and the radio section, wherein when the radio section receives an e-mail, the control section extracts an instruction information from the e-mail, controls the imaging section to pick up an image, determines timing of transmitting the picked-up image to a predetermined destination based on the instruction information, and controls the radio section to transmit the picked-up image at the determined timing.

Furthermore, the instruction information involves information regarding a delay time, the control section determines the timing based on the information regarding a delay time, and the timing is at a moment after the delay time elapses since the imaging section picks up an image.

Furthermore, the instruction information involves information regarding a destination, and the control section determines the predetermined destination based on the information regarding a destination.

Furthermore, after a first imaging is performed by the imaging section in response to a first e-mail received by the radio section, before timing determined based on an instruction information extracted from the first e-mail, and when the radio section receives an second e-mail after receiving the first e-mail, the control section controls the imaging section to perform a second imaging and controls the radio section to transmit a picked-up image provided by the second imaging and a picked-up image provided by the first imaging to the predetermined destination.

Furthermore, the instruction information involves information regarding a destination, and after a first imaging is performed by the imaging section in response to a first e-mail received by the radio section, before timing determined based on an instruction information extracted from the first e-mail, and when the radio section receives an second e-mail after receiving the first e-mail, the control section controls the imaging section to perform a second imaging if a destination specified by an instruction information extracted from the second e-mail matches a destination specified by an instruction information extracted from the first e-mail, and controls the radio section to transmit a picked-up image provided by the second imaging and a picked-up image provided by the first imaging to the destination based on the instruction information of the first or second e-mail.

Furthermore, when the radio section transmits the picked-up image provided by the second imaging and the picked-up image provided by the first imaging, the control section monitors the total data amount of the picked-up image, and controls the radio section to transmit a warning of data amount excess if the total data amount exceeds a predetermined value.

Furthermore, the control section controls the radio section to transmit the warning to a terminal transmitting the second e-mail.

The invention also provides a communication system having: a first portable terminal and a second portable terminal which are connected through a communication network, wherein the first portable terminal involves: an imaging section; a first storage section that stores an image picked up by the imaging section; a first radio section that transmits and receives data through the communication network; and a first control section, when the first radio section receives an e-mail, that extracts an instruction information from the e-mail, controls the imaging section to pick up an image, determines timing of transmitting the picked-up image to a predetermined destination based on the instruction information, and controls the first radio section to transmit the picked-up image at the determined timing, and the second portable terminal involves: a second radio section that transmits and receives data through the communication network; a display section; an operation section; and a second control section that causes the display section to display a plurality of information regarding the timing when a predetermined operation is performed to the operation section, generates the instruction information according to information regarding the timing selected through the operation section, describes the instruction information in an e-mail, and controls the second radio section to transmit the e-mail.

Furthermore, the instruction information involves information regarding a delay time which the second portable terminal sets, the first control section determines the timing based on the information regarding a delay time, and the timing is at a moment after the delay time elapses since the imaging section picks up an image.

Furthermore, the instruction information involves information regarding a destination which the second portable terminal sets, and the first control section determines the predetermined destination based on the information regarding a destination.

Furthermore, after a first imaging is performed by the imaging section in response to a first e-mail received by the first radio section, before timing determined based on an instruction information extracted from the first e-mail, and when the first radio section receives an second e-mail after receiving the first e-mail, the first control section controls the imaging section to perform a second imaging and controls the first radio section to transmit a picked-up image provided by the second imaging and a picked-up image provided by the first imaging to the predetermined destination.

Furthermore, the instruction information involves information regarding a destination, and after a first imaging is performed by the imaging section in response to a first e-mail received by the first radio section, before timing determined based on an instruction information extracted from the first e-mail, and when the first radio section receives an second e-mail after receiving the first e-mail, the first control section controls the imaging section to perform a second imaging if a destination specified by an instruction information extracted from the second e-mail matches a destination specified by an instruction information extracted from the first e-mail, and controls the first radio section to transmit a picked-up image provided by the second imaging and a picked-up image provided by the first imaging to the destination based on the instruction information of the first or second e-mail.

Furthermore, when the first radio section transmits the picked-up image provided by the second imaging and the picked-up image provided by the first imaging, the first control section monitors the total data amount of the picked-up image, and controls the first radio section to transmit a warning of data amount excess if the total data amount exceeds a predetermined value.

Furthermore, the first control section controls the first radio section to transmit the warning to a terminal transmitting the second e-mail.

Therefore, the picked-up images picked up by remote control can be reliably transmitted with the e-mail, the consumption of the battery can be suppressed, the communication cost can be reduced, and the number of operation times of opening e-mail in the portable terminal receiving the e-mail can be decreased.

BRIEF DESCRIPTION OF THE DRAWINGS

FIG. 3 is a drawing to show remote mail transmitted from a mobile telephone 2a to a mobile telephone 2b shown in FIG. 2;

FIGS. 7A to 7E are drawings to show a creation and transmission procedure of remote mail in the mobile telephone 2a.

DETAILED DESCRIPTION OF THE PREFERRED EMBODIMENTS

A portable terminal and a communication system according to the invention will be specifically described with reference to the drawings.

FIGS. 1 to 7E are drawings for explaining a mobile telephone 2 (corresponding to a portable terminal) and a communication system according to an embodiment of the invention.

Figure 1:
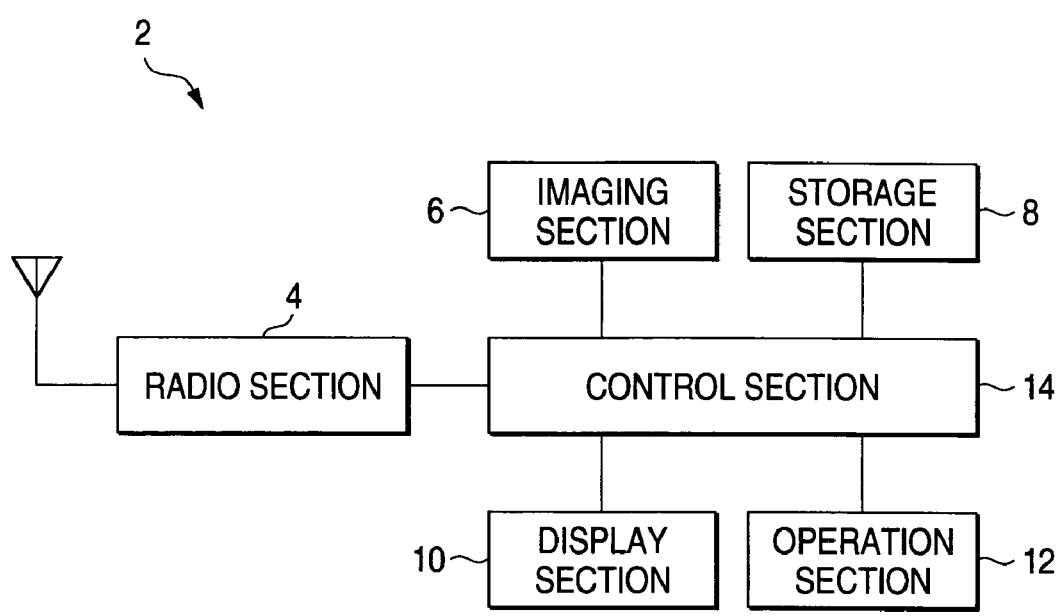
FIG. 1 is a block diagram to show the circuit configuration of a mobile telephone 2 according to one embodiment of the invention.

The mobile telephone 2 of the embodiment has a radio section 4, an imaging section 6, a storage section 8, a display section 10 such as an LCD (Liquid Crystal Display), an operation section 12, and a control section 14 for controlling those sections, as shown in a block diagram of FIG. 1.

The mobile telephone 2 can conduct voice communications and transmit and receive an e-mail by the radio section 4 as well as a general mobile telephone. As a user of the mobile telephone 2 operates the operation section 12, the imaging section 6 can perform an imaging operation. The storage section 8 stores e-mails received by the radio section 4, picked-up images picked up by the imaging section 6 (image data), e-mails created for transmission, and the like.

Figure 2:
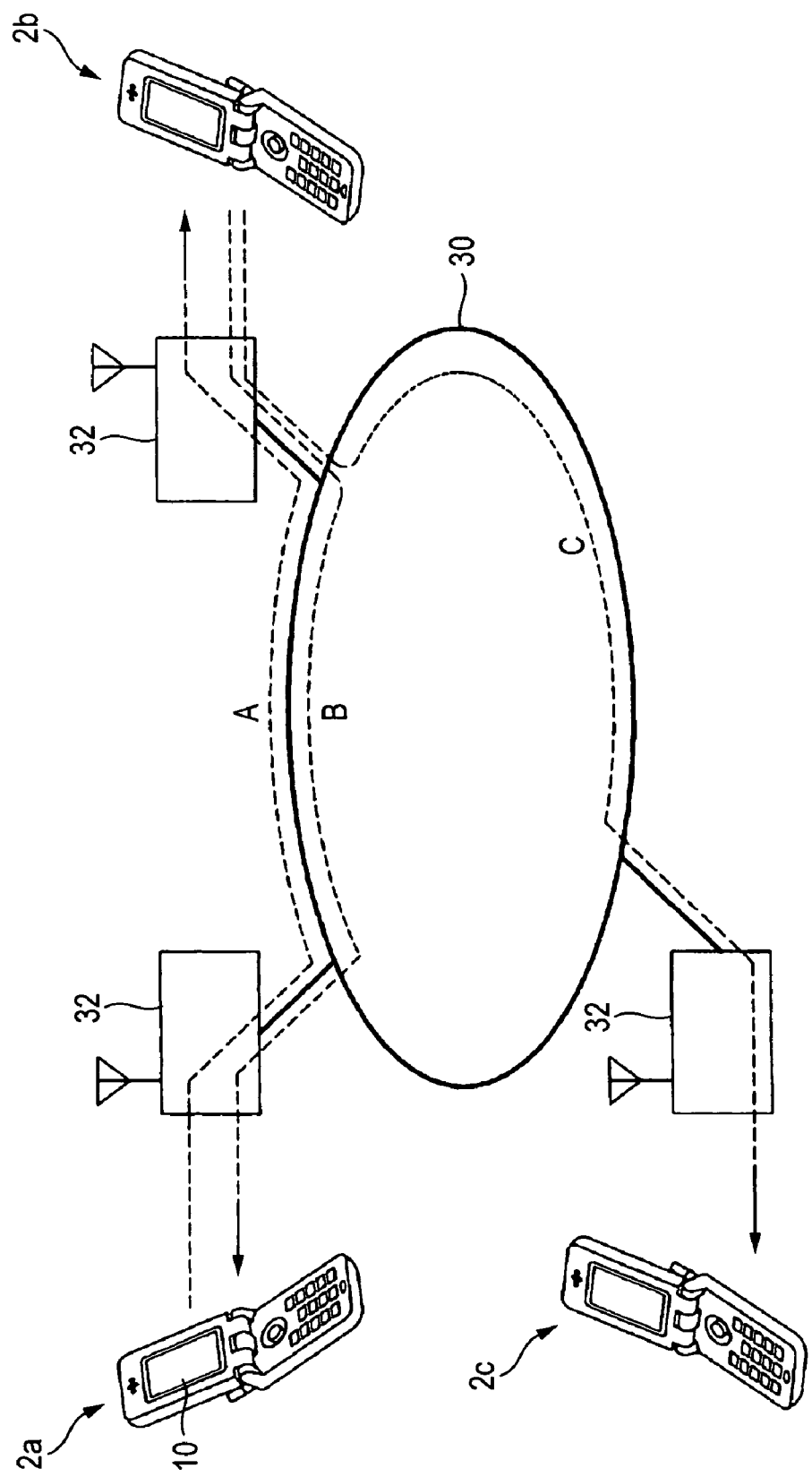
FIG. 2 is a conceptual drawing to show the configuration of a communication system according to the embodiment of the invention.

The operation of the control section 14 when the mobile telephone 2 receives an e-mail as an imaging instruction from another terminal will be discussed based on the case where three mobile telephones 2 of the embodiment can mutually transmit and receive an e-mail through a communication network 30 and nearest base stations 32 like general terminals, as shown in FIG. 2.

The three mobile telephones 2 have the same function. However, since the mobile telephones is caused to perform different operation, the reference numerals of the three mobile telephones 2 are assigned 2a, 2b, and 2c to distinguish from each other in the following description. Their e-mail addresses are "keitai2a@ezweb.ne.jp," "keitai2b@ezweb.ne.jp," and "keitai2c@ezweb.ne.jp" matched with the reference numerals, respectively.

The mobile telephone 2b can receive an e-mail as an imaging instruction transmitted from the mobile telephone 2a (route of arrow A in FIG. 2) and pick up an image and then transmit the picked-up image attached to an e-mail to the mobile telephone 2a or the mobile telephone 2c (route of arrow B or arrow C). At this time, the control section 14 of the mobile telephone 2b performs a processing operation as shown in flowcharts of FIGS. 4 to 6, as described later.

FIG. 3 is a drawing to show the e-mail as the imaging instruction transmitted from the mobile telephone 2a to the mobile telephone 2b. In the following description, such e-mail is referred to as "remote mail". The remote mail involves an imaging instruction information, a destination instruction information, an action instruction information, and a numeric instruction information as instruction information given to the mobile telephone 2b.

That is, the remote mail has a description of "*remote mail*" in the Subject (title of e-mail) on the third line in FIG. 3 as the imaging instruction information. The description on the fifth line sandwiched between tags of <start> on the fourth line and <end> on the sixth line involves the destination instruction information, the action instruction information, and the numeric instruction information, which are described in order and are separated by a colon (:).

Since "keitai2c@ezweb.ne.jp" which is the e-mail address of the mobile telephone 2c is described as the destination instruction information in the remote mail, the mobile telephone 2b is instructed to transmit the picked-up image to the mobile telephone 2c after picking up an image.

The action instruction information is specified as either "1" or "2". If the action instruction information is "1", the action instruction information provides an instruction to transmit the picked-up image after the expiration of the delay time specified by the numeric instruction information described following the action instruction information without immediately transmitting the picked-up image. If the action instruction information is "2", the action instruction information provides an instruction to transmit the picked-up image immediately after picking up an image.

Therefore, the remote mail shown in FIG. 3 instructs the mobile telephone 2b to pick up an image and transmit the picked-up image to the mobile telephone 2c after a lapse of 100 minutes from the imaging.

Figure 4:
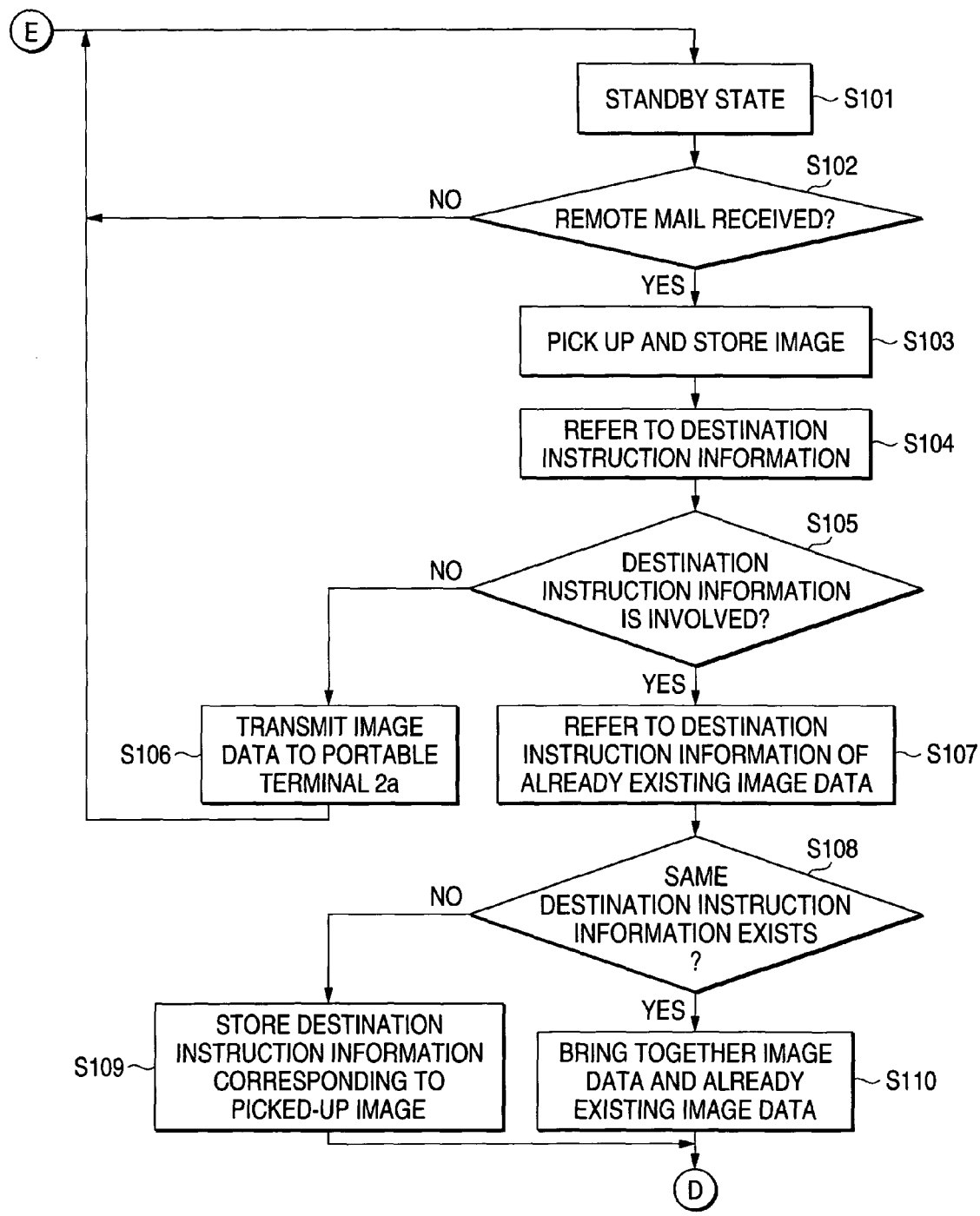
FIG. 4 is a flowchart to show the operation of a control section 14 of the mobile telephone 2b shown in FIG. 2.
Figure 5:
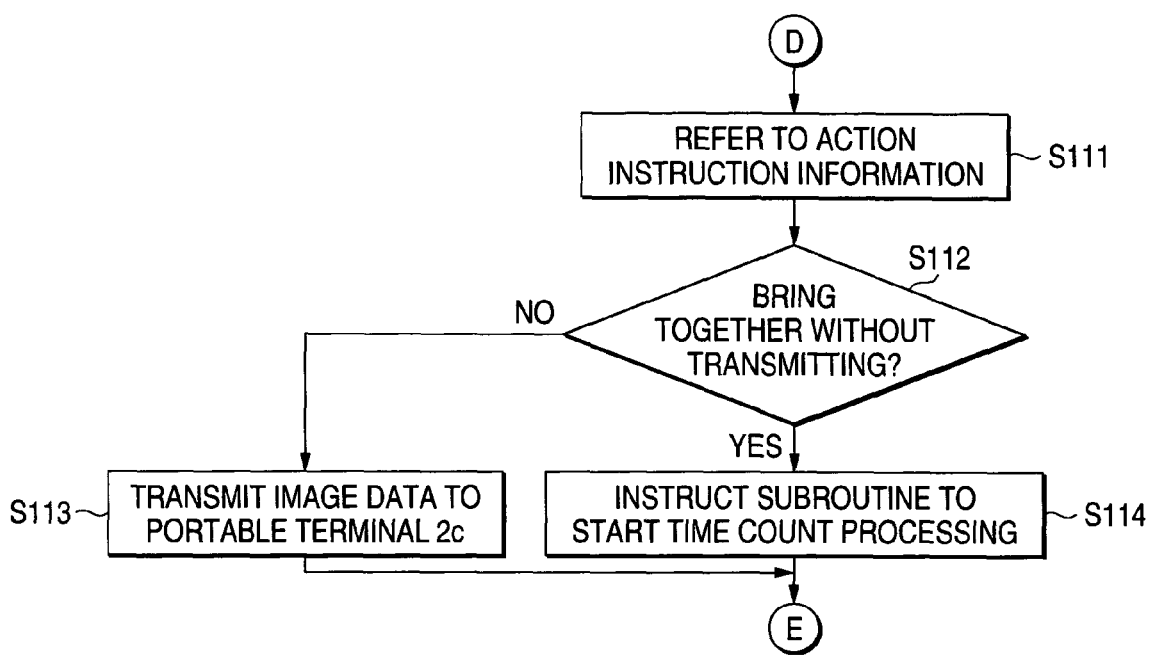
FIG. 5 is a flowchart to show the operation of the control section 14 of the mobile telephone 2b shown in FIG. 2.
Figure 6:
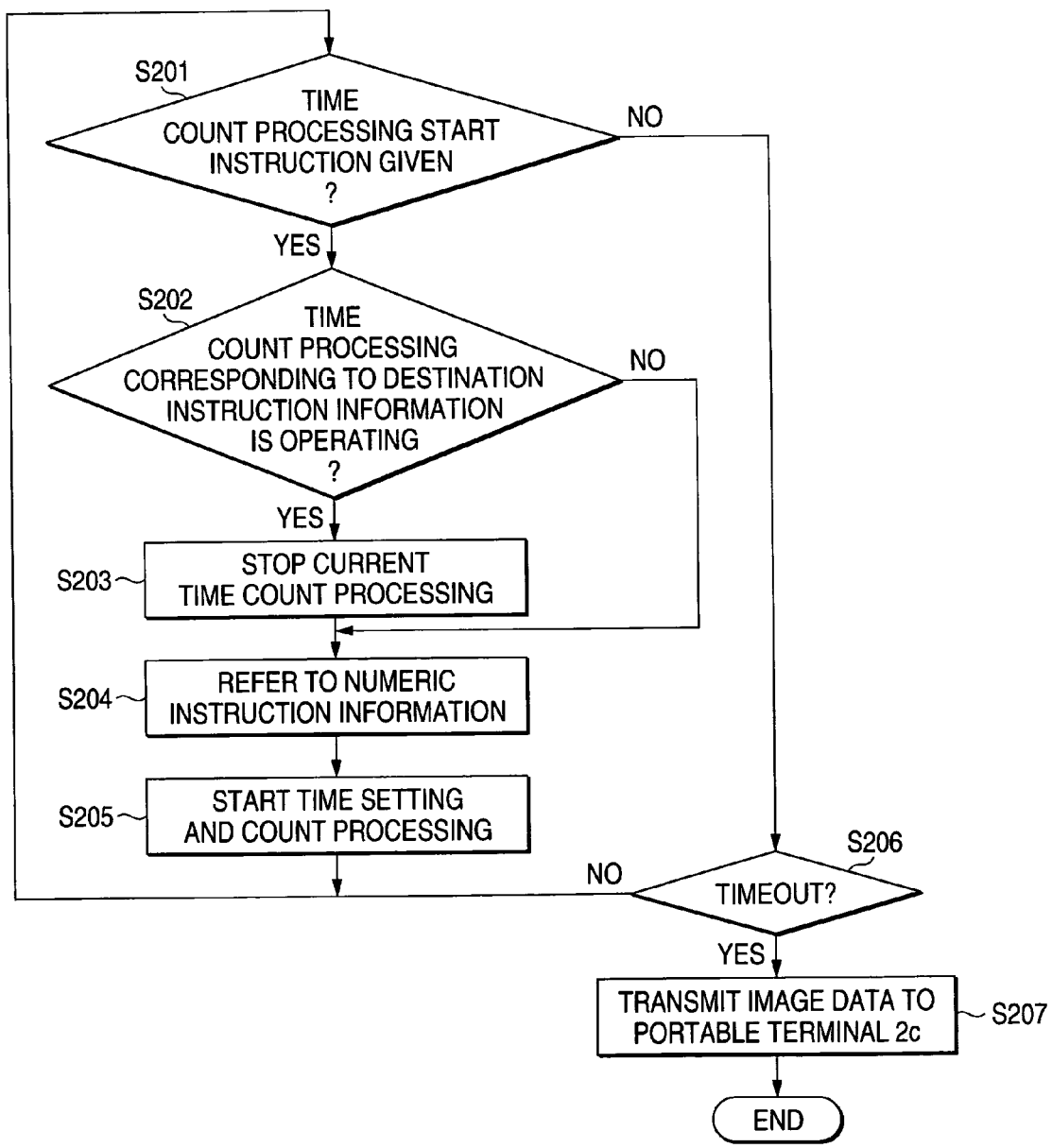
FIG. 6 is a flowchart to show the operation of the control section 14 of the mobile telephone 2b shown in FIG. 2.

When the mobile telephone 2b receives such remote mail, the control section 14 of the mobile telephone 2b performs a processing operation as shown in flowcharts of FIGS. 4 to 6. FIGS. 4 and 5 show the main routine, and FIG. 6 shows a subroutine.

When the mobile telephone 2b is in a standby state where it waits for being called or receiving an e-mail (step S101 in FIG. 4), if the mobile telephone 2b receives a remote mail transmitted from the mobile telephone 2a (YES at step S102), the control section 14 of the mobile telephone 2b determines that the received mail is a remote mail based on the imaging instruction information in the received e-mail. The control section 14 controls the imaging section 6 to perform the imaging operation and store the picked-up image in the storage section 8 (step S103).

In the standby state at step S101, if the mobile telephone 2b receives an e-mail other than the remote mail or is called (NO at step S102), the mobile telephone 2b performs a processing operation similar to that of a general mobile telephone and then returns to the standby state (step S101).

After storing the picked-up image in the storage section 8 at step S103, the control section 14 extracts a destination instruction information from the received remote mail and refers to the destination instruction information (step S104).

If the mobile telephone 2b receives a remote mail in which no destination instruction information is described rather than the remote mail as shown in FIG. 3 (NO at step S105), the picked-up image stored in the storage section 8 is transmitted to the mobile telephone 2a which transmitted the remote mail and is also erased from the storage section 8 (step S106).

If a remote mail received from the mobile telephone 2a is the remote mail as shown in FIG. 3 and involves a destination instruction information (YES step S105), the control section 14 goes to step S107 for performing a processing operation of bringing together the picked-up image stored in the storage section 8 at step S103 and other picked-up images stored in the storage section 8 having the same destination as that picked-up image.

If an image was already picked up according to another remote mail received before the remote mail received at step S102, the mobile telephone 2b can leave the picked-up image in the storage section 8 until a lapse of the time specified by the numeric instruction information in the another remote mail without immediately transmitting the picked-up image as described later (YES at step S112 and step S114).

Thus, the control section 14 checks whether or not a picked-up image having the same destination instruction information as the remote mail received at step S102 is left in the storage section 8 (step S107).

If a picked-up image having the same destination instruction information is stored in the storage section 8 (YES at step S108), the picked-up image and the picked-up image stored in the storage section 8 at step S103 are brought together (step S110).

If a picked-up image having the same destination instruction information is not stored in the storage section 8 (NO at step S108), the destination instruction information in the current remote mail received at step S102 is stored in the storage section 8 in association with the picked-up image stored at step S103 (step S109).

Next, the control section 14 extracts and refers to an action instruction information in the remote mail (step S111 in FIG. 5). If the action instruction information is "1" as in the remote mail shown in FIG. 3 (YES at step S112 in FIG. 5), a subroutine for performing a time count operation shown in FIG. 6 is started (step S114 in FIG. 5) and the process returns to step S101 in FIG. 4 without transmitting the picked-up images brought together by identical destination instruction information at step S109 or S110 in FIG. 4.

If the action instruction information in the current remote mail received at step S102 is "2" unlike that in the remote mail shown in FIG. 3 (NO at step S112), the control section 14 immediately transmits the picked-up images brought together by identical destination instruction information at step S109 or S110 in FIG. 4 in accordance with the destination instruction information in the remote mail with an e-mail addressed to the mobile telephone 2c (S113 in FIG. 5). The control section 14 erases the transmitted picked-up images from the storage section 8 and returns to step S101 in FIG. 4.

When a time count processing start instruction is given to the subroutine at step S114 in FIG. 5, the control section 14 determines at step S201 in the subroutine whether or not to perform processing operation at steps S202 to S205 (YES at step S201) as shown in FIG. 6.

The subroutine occurs for each destination instruction information, and the processing operation of the subroutine corresponding to one destination instruction information does not affect the subroutine performing similar processing operation corresponding to any other destination instruction information.

The control section 14 first determines whether or not the time count processing corresponding to the destination instruction information already operates (step S202). If the time count processing corresponding to the destination instruction information already operates (YES at step S202), the control section 14 stops the time count processing (step S203). If the time count processing corresponding to the destination instruction information does not operate (NO at step S202), the control section 14 immediately goes to step S204.

The control section 14 extracts a numeric instruction information from the current remote mail received at step S102 in FIG. 4 and refers to the numeric instruction information (step S204 in FIG. 5), and determines that the transmission timing at step S207 described later is when the time based on the numeric instruction information has elapsed. The control section 14 further starts counting the time (step S205) and then returns to step S201.

Upon completion of counting the time based on the numeric instruction information since the time count processing operation corresponding to the destination instruction information was started (YES at step S206), the control section 14 transmits the picked-up images corresponding to the destination instruction information and stored together in the storage section 8 by performing the processing operation at step S109 or S110 in FIG. 4 with an e-mail which destination is indicated by the destination instruction information (step S207). The transmitted picked-up images are erased from the storage section 8 and the processing operation in the subroutine is terminated.

Therefore, after the expiration of the delay time of 100 minutes substantially from the imaging at step S103 in FIG. 4 corresponding to the numeric instruction information in the remote mail as shown in FIG. 3 (YES at step S206 in FIG. 6), the mobile telephone 2b collectively transmits the picked-up images in the storage section 8 to the mobile telephone 2c (step S207) and erases the picked-up images from the storage section 8.

If a mobile telephone for picking up an image by remote control has a function of automatically transmitting an e-mail when a predetermined number of imaging times, a predetermined storage capacity, or a predetermined transmission capacity is reached to a threshold value, a plurality of picked-up images are brought together to one piece of e-mail for transmission and the problems of consumption of the battery and an increase in the communication cost of the mobile telephone which transmits the picked-up images after imaging and an increase in the number of operation times in the receiving terminal can be solved. However, if the predetermined number of imaging times, etc., is not reached, the e-mail is not transmitted and a new problem of degradation of the reliability of the transmission operation occurs. In contrast, the mobile telephone 2b of the embodiment prevents occurrence of such a problem of degradation of the reliability of the transmission operation.

A creation and transmission procedure of the remote mail with using the mobile telephone 2a will be discussed. The user of the mobile telephone 2a can easily create and transmit the remote mail as instructed on a screen displayed on the display section 10 of the mobile telephone 2a shown in FIG. 2.

When menu items are displayed on the display section 10 of the mobile telephone 2a as shown in FIG. 7A, if the user selects and determines an item of remote mail among the mail items, a screen for entering a destination instruction information is displayed as shown in FIG. 7B by the processing operation of the control section 14 corresponding to the user's operation.

The user can enter the e-mail address of the mobile telephone 2c for the screen for entering destination instruction information as the destination of picked-up images to be transmitted by the mobile telephone 2b to be remotely controlled.

If the user enters and determines destination instruction information, a screen for selecting "1" or "2" as action instruction information is displayed as shown in FIG. 7C.

When the user selects and determines the action instruction information, then a screen for selecting numeric instruction information for causing the mobile telephone 2b to count the time is displayed as shown in FIG. 7D. A plurality of numeric instruction information are displayed on the display section 10 and if the user selects any one from among the numeric instruction information and determines the selection, the control section 14 generates remote mail for giving an imaging instruction as shown in FIG. 3.

The generated remote mail is immediately transmitted, and animation as shown in FIG. 7E is displayed on the display section 10, informing the user that the remote mail has been transmitted.

As described above, according to the mobile telephone 2 and the communication system, the picked-up images picked up by remote control can be reliably transmitted with e-mail, consumption of the battery can be suppressed, the communication cost can be reduced, and the number of operation times of opening the e-mail in the portable terminal receiving the e-mail can be decreased.

In the embodiment, the mobile telephone 2a transmits the remote mail to the mobile telephone 2b as shown in FIG. 2, but a general terminal capable of transmitting and receiving the e-mail rather than the mobile telephone 2a may transmit the remote mail. In such a case, the remote mail as shown in FIG. 3 may be manually entered and transmitted.

In the embodiment, the mobile telephone 2c receives the picked-up image transmitted from the mobile telephone 2b as shown in FIG. 2, but a general terminal capable of transmitting and receiving the e-mail rather than the mobile telephone 2c may be specified by destination instruction information in the remote mail for receiving the picked-up image.

In the embodiment, the control section 14 counts the time until a lapse of the time specified by the numeric instruction information in remote mail at step S206 in FIG. 6, but may always count predetermined time independently of the numeric instruction information in remote mail.

In the embodiment, the mobile telephone 2b transmits the picked-up image to the mobile telephone 2c specified by destination instruction information in remote mail, but may always transmit the picked-up image to another predetermined terminal independently of the destination instruction information in remote mail.

In such a case, the processing operation of the control section 14 at steps S104 to S107 in the flowcharts of FIGS. 4 to 6 is not required, and step S108 may be executed just after step S103.

In the embodiment, according to the operation of the subroutine in FIG. 6 for performing the time count processing corresponding to the destination instruction information in remote mail, if the destination instruction information of the picked-up image stored in the storage section 8 without being transmitted matches the destination instruction information in newly received remote mail (YES at step S108 in FIG. 4), the already existing picked-up image and a new picked-up image are brought together (step S110), but an image may be picked up only if the destination instruction information of the picked-up image stored in the storage section 8 without being transmitted matches the destination instruction information in newly received remote mail.

That is, after a first remote mail having an action instruction information set to "1" is received and the first imaging is performed by the imaging section, if a second remote mail is received during the delay time in which the picked-up image is stored in the storage section 8 corresponding to the numeric instruction information, the control section 14 determines whether or not the second remote mail is received at step S102 and at the same time, determines whether or not the destination instruction information in the second remote mail matches the destination instruction information of the already existing picked-up image stored in the storage section 8. The processing operation at step S103 and the later is performed only if they match.

In such a case, the subroutines corresponding to the two or more destination instruction information cannot coexist, and only one subroutine performs the processing operation, needless to say.

In the embodiment, the picked-up images are only transmitted to the mobile telephone 2c specified by destination instruction information at step S207 in FIG. 6. However, when an e-mail involving the picked-up images is transmitted, the control section 14 may monitor the total data amount of the picked-up images and if the total data amount exceeds a predetermined value, a warning indicating data amount excess may be added to the e-mail for transmission.

Accordingly, the total data amount of the picked-up images attached to the e-mail can be prevented from exceeding the mail attachable capacity (for example, 100 kilobytes) defined on traffic management by the common carrier, and transmission of the e-mail is prevented from ending in failure.

In the case of transmitting the e-mail to which the warning is added to the mobile telephone 2c, an e-mail with a similar warning may also be transmitted to the mobile telephone 2a at the same time.

If there are a plurality of terminals transmitting e-mail in addition to the mobile telephone 2a, the e-mail with the warning may be transmitted only to the terminal transmitting the last remote mail.

For example, if the transmitting party of the first remote mail to the mobile telephone 2b is any other terminal than the mobile telephone 2a and the transmitting party of the second remote mail of the last remote mail is the mobile telephone 2a, the e-mail with the warning from the mobile telephone 2b is transmitted to the mobile telephone 2a.

In the embodiment, the case where the invention is applied to the mobile telephone 2 has been described, but the invention can also be applied to other portable terminals each including an imaging apparatus and a transceiver that can transmit a picked-up image picked up by the imaging apparatus, needless to say.

What is claimed is:

1. A portable terminal comprising:
an imaging section;
a storage section that stores an image picked up by the imaging section;
a radio section that transmits and receives e-mail through a communication network; and
a control section that controls the imaging section and the radio section,
wherein when the radio section receives an e-mail, the control section does a plurality of processing;
wherein a plurality of processing is:
a first-controlling the imaging section to pick up an image;
an extracting an instruction information from the e-mail;
a determining timing of transmitting the picked-up image to a predetermined destination based on the instruction information; and
a second controlling the radio section to transmit the picked-up image at the determined timing; and wherein the instruction information involves information regarding a delay time,
the determining timing based on the information regarding the delay time, and
the timing is at a moment after the delay time has elapsed since the imaging section picks up an image.

2. The portable terminal according to claim 1,
wherein the instruction information involves information regarding a destination, and
the predetermined destination is based on the information regarding a destination.

3. The portable terminal according to claim 1,
wherein after the first-controlling the imaging section to pick up a first image and, before the determined timing of transmitting the first picked-up image, the radio section receives a second e-mail and the control section further does a third-controlling the imaging section to pick up a second image and thereafter, the second-controlling the radio section transmits said first and second picked-up images together to the predetermined destination.

4. The portable terminal according to claim 3,
wherein the second-controlling the radio section transmits said first and second picked-up images further comprises monitoring a total data amount of the transmitted images, and controls the radio section to transmit a warning of data amount excess if the total data amount exceeds a predetermined value.

5. The portable terminal according to claim 4,
wherein the control section controls the radio section to transmit the warning to a terminal transmitting the second e-mail.

6. The portable terminal according to claim 1,
wherein the instruction information involves information regarding a first destination, and
wherein after the first-controlling the imaging section to pick up a first image and, before the determined timing of transmitting the first picked-up image, the radio section receives a second e-mail and the control section further does a third-controlling the imaging section to pick up a second image if a second destination specified by a second instruction information extracted from the second e-mail matches the first destination, and thereafter, the second-controlling the radio section transmits said first and second picked-up images together to the first or second destination.

7. The portable terminal according to claim 6,
wherein the second-controlling the radio section transmits said first and second picked-up images further comprises monitoring a total data amount of the transmitted images, and controls the radio section to transmit a warning of data amount excess if the total data amount exceeds a predetermined value.

8. The portable terminal according to claim 7,
wherein the control section controls the radio section to transmit the warning to a terminal transmitting the second e-mail.

9. The portable terminal according to claim 1, wherein the control section performs the first-controlling, the extracting, and the determining in response to the radio section receiving the e-mail.

10. A communication system comprising:
a first portable terminal and a second portable terminal which are connected through a communication network,
wherein the first portable terminal involves:
an imaging section;
a first storage section that stores an image picked up by the imaging section;
a first radio section that transmits and receives data through the communication network; and
a first control section, when the first radio section receives an e-mail, that extracts an instruction information from the e-mail, controls the imaging section to pick up an image, determines timing of transmitting the picked-up image to a predetermined destination based on the instruction information, and controls the first radio section to transmit the picked-up image at the determined timing, and
the second portable terminal involves:
a second radio section that transmits and receives data through the communication network;
a display section;
an operation section; and
a second control section that causes the display section to display a plurality of information regarding the timing of transmitting of the picked up image when a predetermined operation is performed to the operation section, generates the instruction information according to information regarding the timing selected through the operation section, describes the instruction information in an e-mail, and controls the second radio section to transmit the e-mail; and wherein the instruction information involves information regarding a delay time which the second portable terminal sets, the first control section determines the timing based on the information regarding the delay time, and the timing is at a moment after the delay time elapses since the imaging section picks up an image.

11. The communication system according to claim 10, wherein the instruction information involves information regarding a destination which the second portable terminal sets, and the first control section determines the predetermined destination based on the information regarding a destination.

12. The communication system according to claim 10, wherein after a first imaging is performed by the imaging section in response to a first e-mail received by the first radio section, before timing determined based on an instruction information extracted from the first e-mail, and when the first radio section receives an second e-mail after receiving the first e-mail, the first control section controls the imaging section to perform a second imaging and controls the first radio section to transmit a picked-up image provided by the second imaging and a picked-up image provided by the first imaging together to the predetermined destination.

13. The communication system according to claim 12, wherein when the first radio section transmits the picked-up image provided by the second imaging and the picked-up image provided by the first imaging, the first control section monitors the total data amount of the picked-up image, and controls the first radio section to transmit a warning of data amount excess if the total data amount exceeds a predetermined value.

14. The communication system according to claim 13, wherein the first control section controls the first radio section to transmit the warning to a terminal transmitting the second e-mail.

15. The communication system according to claim 10, wherein the instruction information involves information regarding a destination, and wherein after a first imaging is performed by the imaging section in response to a first e-mail received by the first radio section, before timing determined based on an instruction information extracted from the first e-mail, and when the first radio section receives an second e-mail after receiving the first e-mail, the first control section controls the imaging section to perform a second imaging if a destination specified by an instruction information extracted from the second e-mail matches a destination specified by an instruction information extracted from the first e-mail, and controls the first radio section to transmit a picked-up image provided by the second imaging and a picked-up image provided by the first imaging together to the destination based on the instruction information of the first or second e-mail.

16. The communication system according to claim 15, wherein when the first radio section transmits the picked-up image provided by the second imaging and the picked-up image provided by the first imaging, the first control section monitors the total data amount of the picked-up image, and controls the first radio section to transmit a warning of data amount excess if the total data amount exceeds a predetermined value.

17. The communication system according to claim 16, wherein the first control section controls the first radio section to transmit the warning to a terminal transmitting the second e-mail.

18. The communication system according to claim 10, wherein the first control section performs the extracting an instruction information from the e-mail, controlling the imaging section to pick up an image, and determining timing of transmitting the picked-up image to a predetermined destination in response to the first radio section receiving the e-mail.

* * * * *